UNITED STATES PATENT OFFICE.

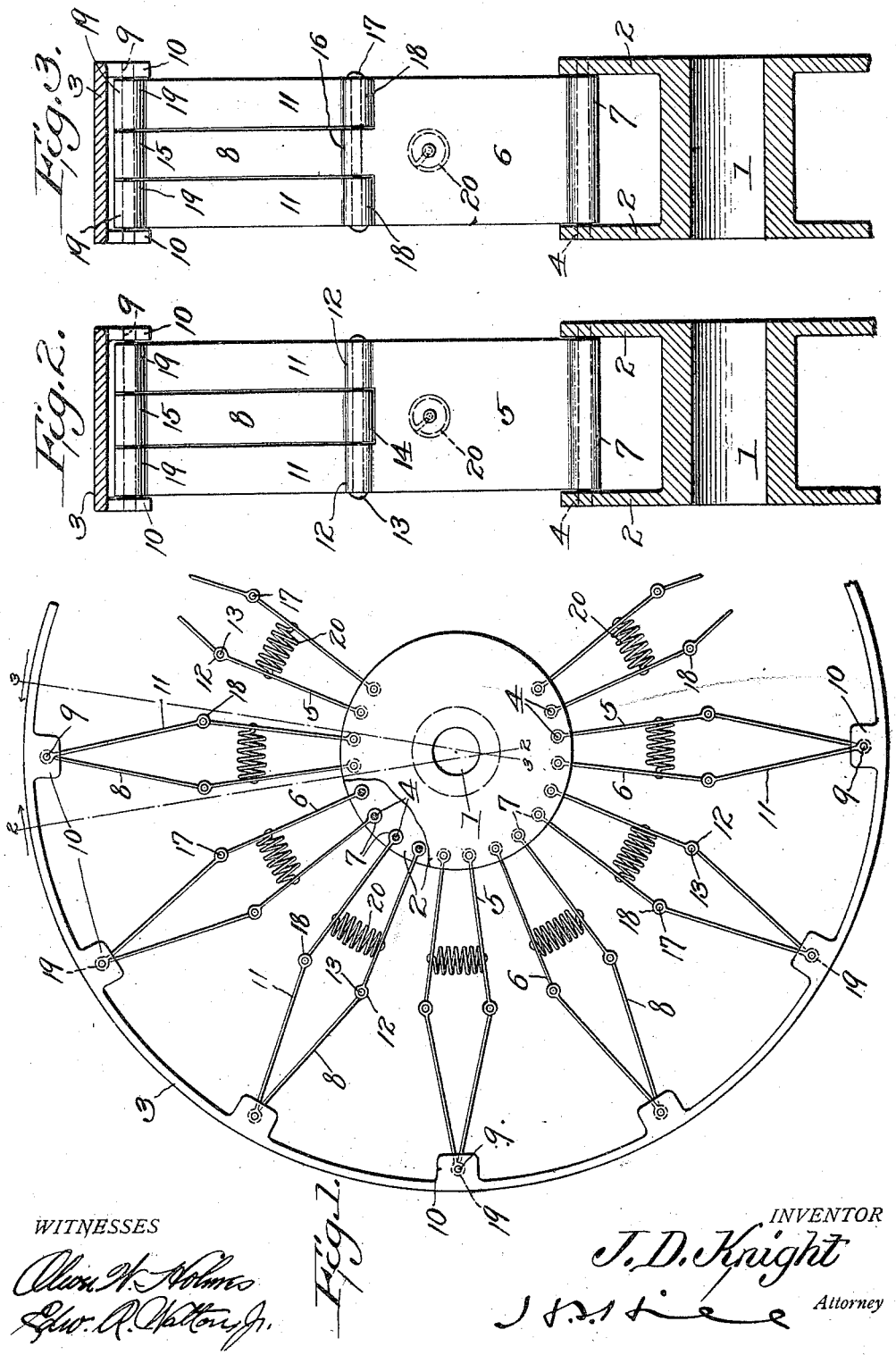

JOEL D. KNIGHT, OF LOMBARDY, MISSISSIPPI.

SPRING-WHEEL.

1,038,764.  Specification of Letters Patent.  Patented Sept. 17, 1912.

Application filed February 29, 1912. Serial No. 680,714.

*To all whom it may concern:*

Be it known that I, JOEL D. KNIGHT, a citizen of the United States, residing at Lombardy, in the county of Sunflower and State of Mississippi, have invented certain new and useful Improvements in Spring-Wheels, of which the following is a specification.

The present invention relates to certain new and useful improvements in spring wheels, and has for its object to provide a wheel of this character which is comparatively simple and inexpensive in its construction, and which embodies novel features of construction whereby sudden shocks and jars are partially or entirely absorbed and prevented from being transmitted to the axle.

A further object of the invention is to provide a spring wheel which comprises few and durable parts, which can be easily and quickly repaired, and which can be manufactured at very little increase in cost over the ordinary rigid wheel.

A still further object of the invention is to provide a spring wheel which is constructed entirely of metal and which absorbs the shocks and jars in substantially the same manner as the ordinary pneumatic tire, thereby rendering it unnecessary to use the pneumatic tire.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a spring wheel constructed in accordance with the invention, one side thereof being broken away. Fig. 2 is a sectional view on the line 2—2 of Fig. 1, looking in the direction of the arrow, and Fig. 3 is a sectional view on the line 3—3 of Fig. 1, looking in the direction of the arrow.

Corresponding and like parts are referred to in the following description and indicated in all the views of the drawing by the same reference characters.

Specifically describing the present embodiment of the invention, the numeral 1 designates a hub which is provided at opposite ends thereof with the outwardly projecting annular flanges 2. A rim 3 surrounds the hub 1, the said hub being normally disposed at the center of the rim. The flanges 2 at opposite ends of the hub are connected by the pins 4 which are arranged in pairs. Pivotally mounted upon these pins 4 are the inner ends of substantially radial members which connect the hub and the rim and are also arranged in pairs. These radial members are constructed so that the intermediate portions thereof can be moved toward or away from each other, and in the present instance the radial members are shown as formed in jointed sections. The inner sections 5 and 6 of each pair of the radial members are in the nature of plates which are formed at the inner ends with the sleeves 7 adapted to receive the pins 4 of the hub. The outer end of the member 5 is connected by a bar 8 to a pin 9 connecting a pair of inwardly projecting ears 10 upon the rim. In a somewhat analogous manner the outer end of the plate 6 is connected by a pair of bars 11 to the same pin 9. The bar 8 and the two bars 11 have a combined width equal to the width of a single plate 5 or 6 and also substantially equal to the width of the rim and the distance between the hub flanges 2. The outer end of the plate 5 is formed at opposite sides thereof with the eyes 12 which receive a pin 13, the said pin also passing through an eye 14 at the inner end of the bar 8. The outer end of the bar 8 is formed with a similar eye 15 which engages the pin 9. The outer end of the plate 6 is formed at the middle portion thereof with an eye 16 receiving the intermediate portion of a pin 17, the ends of the pin engaging eyes 18 at the inner ends of the two bars 11. The outer ends of the bars 11 are formed with eyes 19 which engage the pin 9 on opposite sides of the eye 15 of the bar 8. With this construction, it will be obvious that the hinged joints between the outer and inner sections of each pair of radial spoke members are adapted to be moved toward and away from each other to vary the effective length of the spoke members as the position of the hub is shifted within the rim. The plates 5 and 6 of each pair of radial members are connected by a coil spring 20 which may act both as a tension and compression spring. These springs 20 normally hold the various parts yieldingly in position, and serve to absorb the shocks and jars so that they are not transmitted with full force to the hub. A cushioning means is thus provided between the rim and the hub, since the hub is connected to the rim by means of the hinged spoke members which can be forced apart or drawn together as may be necessary.

Having thus described the invention, what I claim as new and desire to secure by Letters Patent, is:—

1. In a spring wheel, the combination of a hub, a rim concentric with the hub, pivot pins carried by the hub and arranged in pairs, a single pivot pin carried by the rim for each pair of pivot pins upon the hub, flat plates having the inner ends thereof hinged to the pivot pins of the hub, pivot pins carried by the outer ends of the plates, a plurality of flat bars connecting the said pivot pins at the outer ends of the plates to the corresponding pivot pin of the rim, the combined width of the several flat bars being equal to the width of one of the plates, and tension means holding the plates yieldingly in normal position.

2. In a spring wheel, the combination of a hub formed with a pair of outwardly projecting annular flanges, a rim concentric with the hub, transversely disposed pivot pins connecting the flanges of the hub, flat plates arranged in pairs and having the inner ends thereof pivoted upon the pins of the hub, a transversely disposed pivot pin carried by the rim for each pair of the plates, a series of flat bars having a combined width equal to the width of one of the plates, the outer end of each of the flat bars being pivotally mounted upon the pivot pin of the rim, a portion of the flat bars having the inner ends thereof connected to the outer end of one of the plates, while the remainder of the flat bars have the inner ends thereof connected to the opposite plate, and tension means holding the plates yieldingly in normal position.

In testimony whereof I affix my signature in presence of two witnesses.

JOEL D. KNIGHT.

Witnesses:
E. H. LOMBARD,
G. S. BATTLE.

---

Copies of this patent may be obtained for five cents each, by addressing the "Commissioner of Patents, Washington, D. C."